Jan. 16, 1945.  V. D. CARKONEN  2,367,482
HOT AND COLD WATER MIXER
Filed April 22, 1944  2 Sheets-Sheet 1

Inventor
Victor D. Carkonen,
By Clarence A. O'Brien
and Harvey B. Jacobson
Attorneys

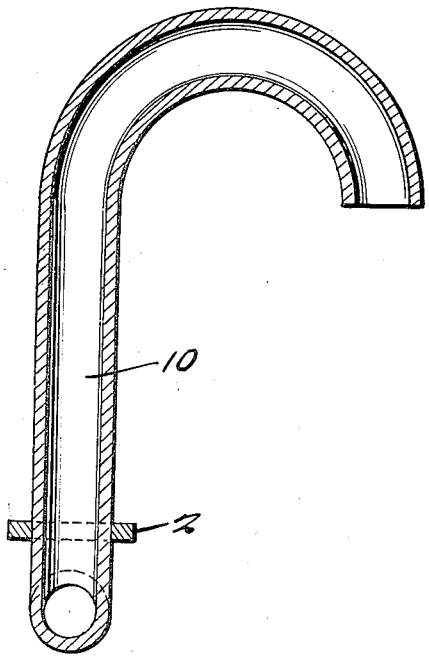
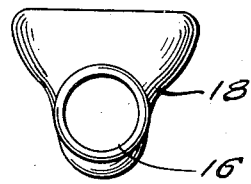
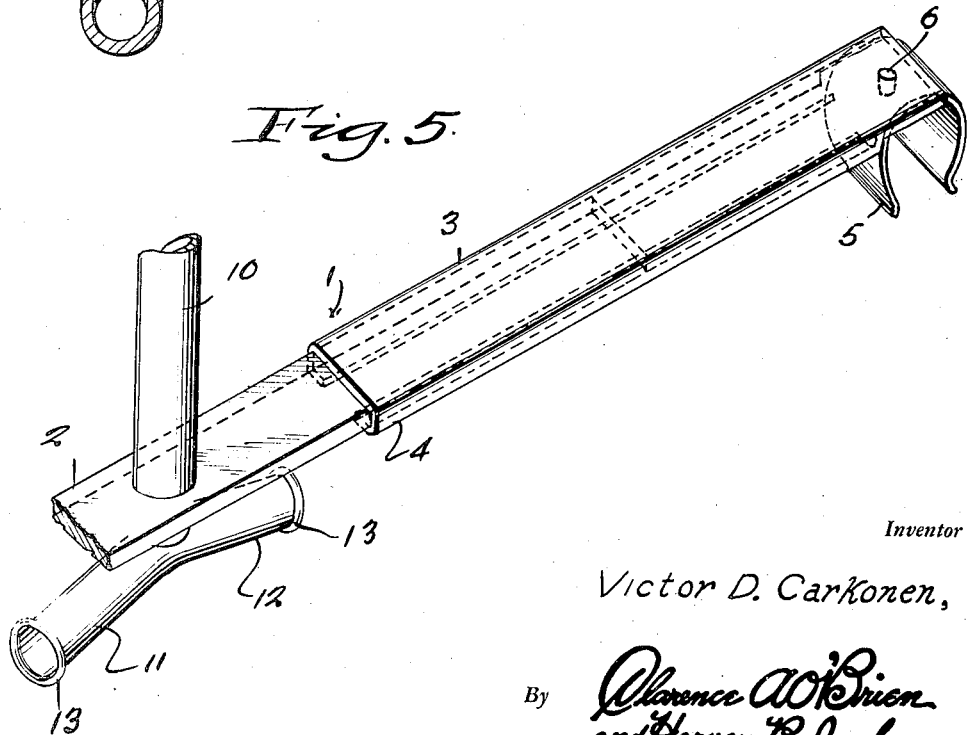

Patented Jan. 16, 1945

2,367,482

UNITED STATES PATENT OFFICE 2,367,482

HOT AND COLD WATER MIXER

Victor D. Carkonen, Seattle, Wash.

Application April 22, 1944, Serial No. 532,276

4 Claims. (Cl. 137—111)

My invention relates to improvements in hot and cold water mixers for twin hot and cold water faucets of sinks, bath tubs and the like, the principal object in view being to provide a simply constructed, inexpensive device of the character indicated which may be easily and quickly applied to twin hot and cold water faucets spaced different distances apart and also out of parallelism.

Other and subordinate objects are also comprehended by my invention, all of which, together with the precise nature of my improvements, will be readily understood when the succeeding description and claims are read with reference to the drawings accompanying and forming part of this specification.

Figure 1:
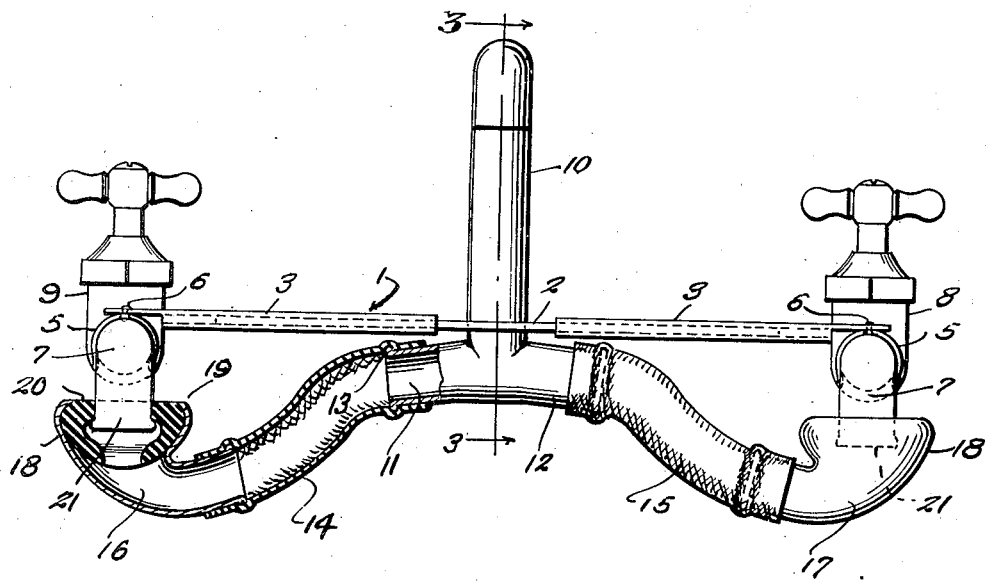
Figure 2:
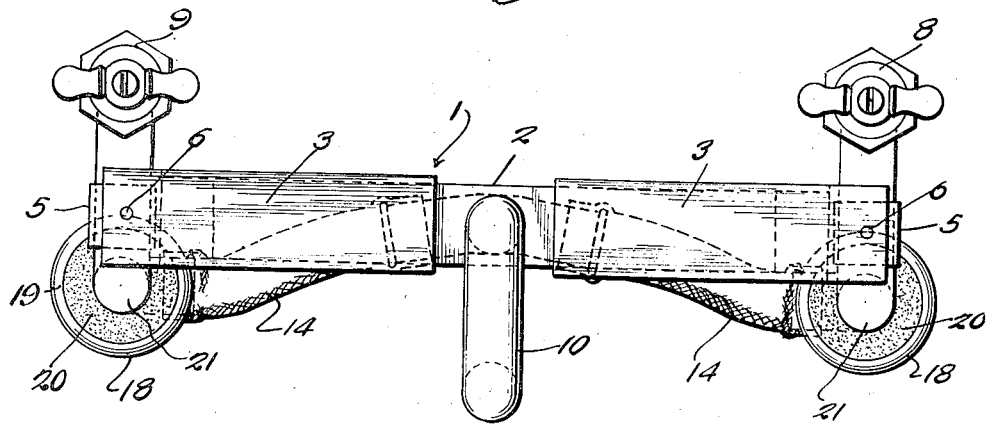

In said drawings:

Figure 1 is a vew in front elevation, with parts in section, illustrating my improved hot and cold water mixer in its preferred embodiment applied to a pair of twin hot and cold water faucets, Figure 2 is a view in plan, Figure 3 is a view in vertical section through the discharge spout and drawn to an enlarged scale, Figure 4 is a view in end elevation of one of the couplings, Figure 5 is a fragmentary view in perspective of the bridge member and discharge spout.

Referring to the drawings by numerals, my improved hot and cold water mixer, as illustrated, comprises, as its basic element, a bridge member 1 including a flat bar 2 provided upon opposite sides of its transverse center with a pair of extensible slides 3 of elongated bar-like form having channeled side edges 4 by means of which said slides 3 are slidably mounted on the bar 2 so that the overall length of the bridge member may be extended or contracted as desired. A pair of U-shaped spring clips 5 are pivotally mounted, as at 6, on the outer ends of the slides 3 to depend therefrom and fit over the discharge spouts 7 of a pair of hot and cold water faucets 8, 9, as shown in Figure 1.

A goose neck type hot and cold water mixing and discharge spout 10 extends upwardly through the bar 2 in the transverse center thereof and is suitably secured in said bar. The mixing and discharge spout 10 is provided at its lower end, below the bar 2, with a pair of oppositely extending lateral nipples 11, 12 provided with externally flanged ends, as at 13.

A pair of hose sections 14, 15 are sleeved at one end thereof onto the nipples 11, 12, respectively, and have their other ends similarly connected to the externally flanged ends of a pair of curved couplings 16, 17 terminating in flared sockets 18 having inturned rims 19. A pair of cup-like gaskets, as at 20, of rubber or the like, are fitted in the sockets 18 and retained therein by the inturned rims 19 of said sockets, said gaskets 20 being adapted to fit with a gripping action over the mouths 21 of the discharge spouts 7 of the faucets 8, 9, respectively.

As will now be seen, the bridge member 1 may be extended or contracted by means of the slides 3 in accordance with the distance between the faucets 8, 9 so that the clips 5 may be applied, in the manner described, and by having said clips 5 pivoted on the slides 3, said clips may be turned to compensate for angular positions of the faucets where the same are out of parallelism, as for instance through faulty plumbing or manufacturing variations. As will also be clear, different lengths of hose sections 14, 15 may be utilized in accordance with the distance between the faucets and the invention involves comparatively few parts and may be manufactured at a relatively low cost.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. In a hot and cold water mixer for attachment to twin hot and cold water faucets, an extensible bridge member adapted to span twin faucets spaced apart different distances, a pair of resilient clips on opposite ends of said member adapted for straddling such twin faucets with a snap action, a goose neck discharge spout fixed to said member in the transverse center thereof, and a pair of hose sections having ends connected to said spout and provided with end sockets adapted for attachment with a friction fit to the outlet ends of said twin faucets respectively.

2. In a hot and cold water mixer for attachment to twin hot and cold water faucets, an extensible bridge member adapted to span twin faucets spaced apart different distances, a pair of resilient clips on opposite ends of said member adapted for straddling such twin faucets with a snap action, a goose neck discharge spout fixed to said member in the transverse center thereof, and a pair of hose sections having ends connected to said spout and provided with end sockets adapted for attachment with a friction lift to the outlet ends of said twin faucets respectively, said bridge member comprising a bar, and a pair of extension slides on opposite ends of the bar.

3. In a hot and cold water mixer for attachment to twin hot and cold water faucets, an extensible bridge member adapted to span twin faucets spaced apart different distances, a pair of resilient clips on opposite ends of said member adapted for straddling such twin faucets with a snap action, a goose neck discharge spout fixed to said member in the transverse center thereof, and a pair of hose sections having ends connected to said spout and provided with end sockets adapted for attachment with a friction fit to the outlet ends of said twin faucets respectively, the connections of said hose sections to the spout comprising a pair of oppositely extending nipples on said spout to which said ends of the hose sections are detachably attached.

4. In a hot and cold water mixer for attachment to twin hot and cold water faucets, an extensible bridge member adapted to span twin faucets spaced apart different distances, a pair of resilient clips on opposite ends of said member adapted for straddling such twin faucets with a snap action, a goose neck discharge spout fixed to said member in the transverse center thereof, and a pair of hose sections having ends connected to said spout and provided with end sockets adapted for attachment with a friction fit to the outlet ends of said twin faucets respectively, said end sockets flaring and having fixed therein a pair of annular resilient gaskets whereby the sockets are adapted to frictionally fit said outlet ends of the faucets.

VICTOR D. CARKONEN.